Dec. 5, 1933.  R. T. WILLIAMS ET AL  1,937,929
TEMPERATURE REGULATING DEVICE
Filed Aug. 15, 1932  3 Sheets-Sheet 1

Inventors
R. T. Williams
J. R. Williams
By  E. E. Huffman
Att'y.

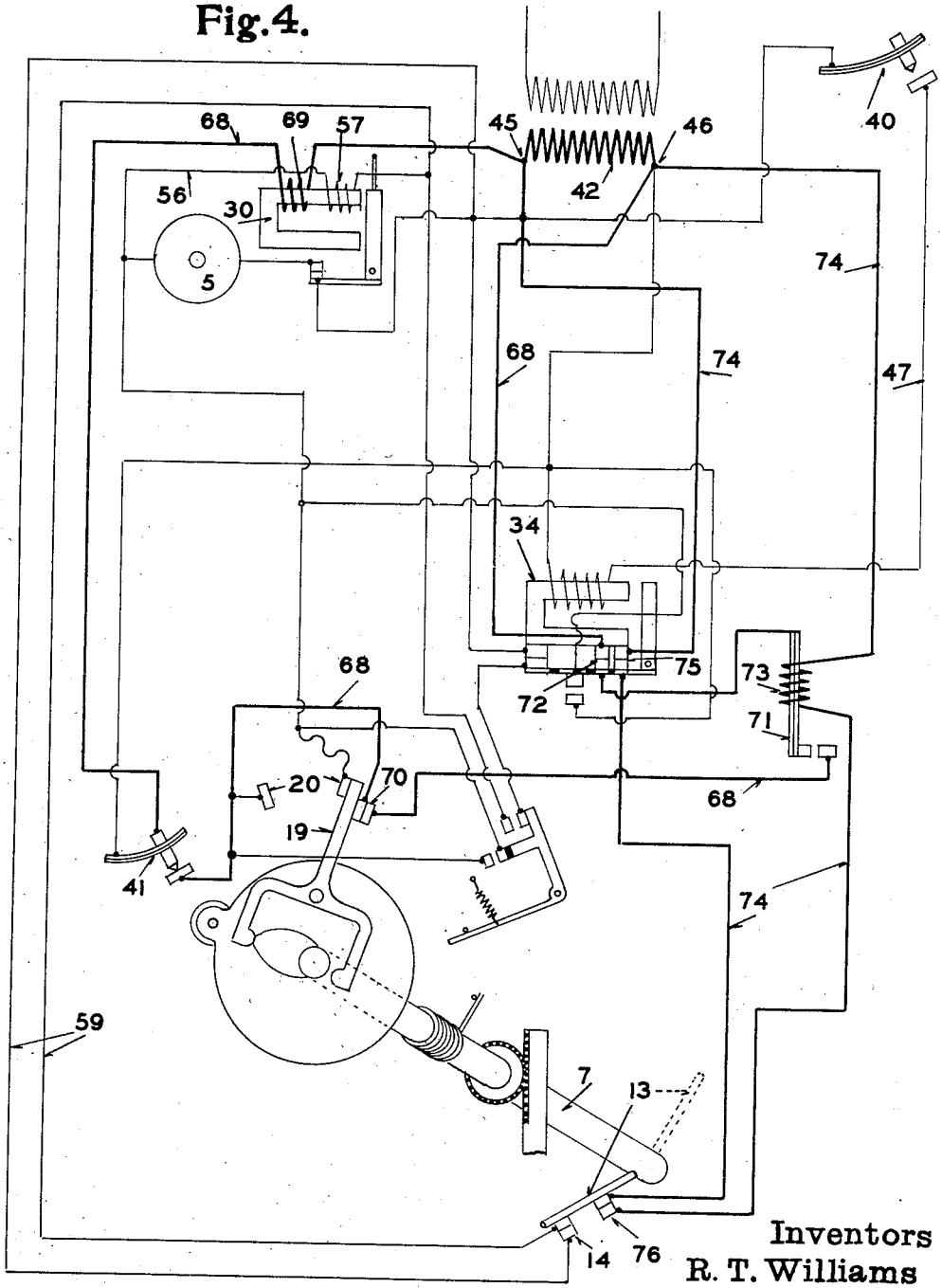

Patented Dec. 5, 1933

1,937,929

UNITED STATES PATENT OFFICE 1,937,929

TEMPERATURE REGULATING DEVICE

Robert T. Williams and James R. Williams, Quincy, Ill.

Application August 15, 1932. Serial No. 628,826

14 Claims. (Cl. 236—74)

Our invention relates to temperature regulating devices and in the specific embodiment set forth in the following specification consists in alterations in and additions to the general type of mechanism shown and described in applications of Lawrence M. Persons, Serial No. 545,017, filed June 17, 1931, and Serial No. 522,589, filed March 14, 1931, and Letters Patent No. 1,855,415 granted April 26, 1932, in which a fuel valve or other heat controlling device is moved against biasing means by an electric motor, the current supply to which is governed by thermostatic means.

In the operation of devices of this class it has been found that under certain conditions stratification of the air takes place, the upper part of the room being at normal temperature while the lower part is at a considerably lower temperature. Under these circumstances the thermostat, which is located in the upper part of the room, will not turn on the heat supply, so that the condition known as "cool 70" will ensue to the discomfort of the occupants of the room. Under other conditions, due to the circulation of the air, the relatively cool and warm areas may occur at different points on the same level.

It is the principal object of our invention to provide a temperature device of the class referred to with an auxiliary thermostatic device located at a distance from the main thermostat, which auxiliary device will so modify the operation of the regulator as to bring it to an intermediate position between its open and closed condition to supply a moderate temperature to the radiator or other heating device, thus producing circulation resulting in uniform temperature throughout the room.

We find that when the regulating device to be controlled is a fuel valve, it may be desirable not merely to bring it to its intermediate position when the auxiliary thermostat functions, but to cause it to move to the full open position, or at least to a point beyond the ultimate intermediate position, and then allow it, after an appreciable length of time, to return to the desired partially open position. The object of this is to insure the ignition of all the burners of the heater which otherwise might fail to occur.

Figure 1:
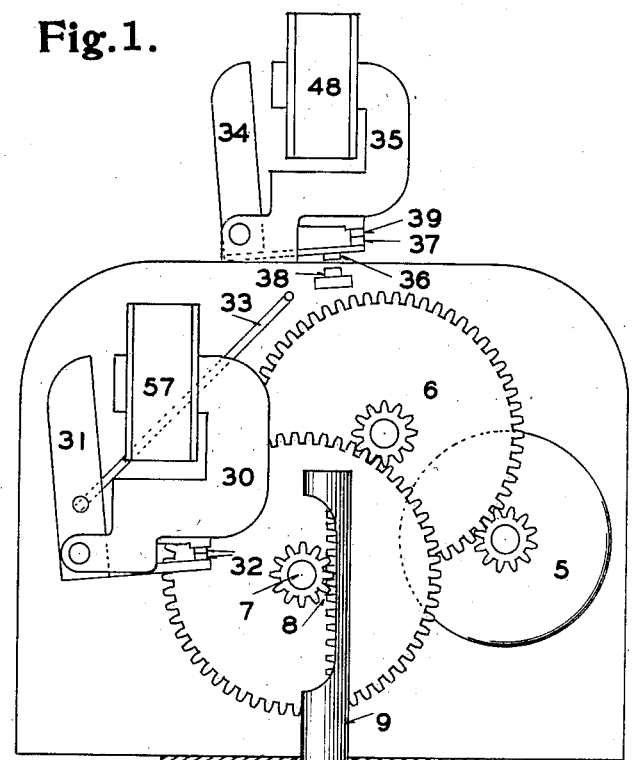
Figure 2:
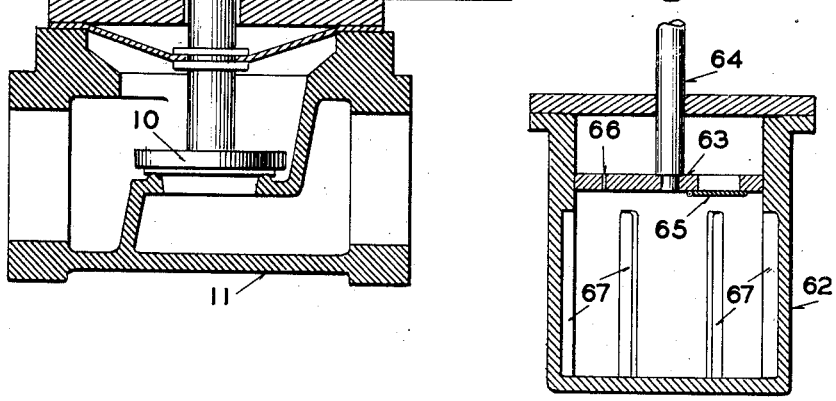
Figure 3:
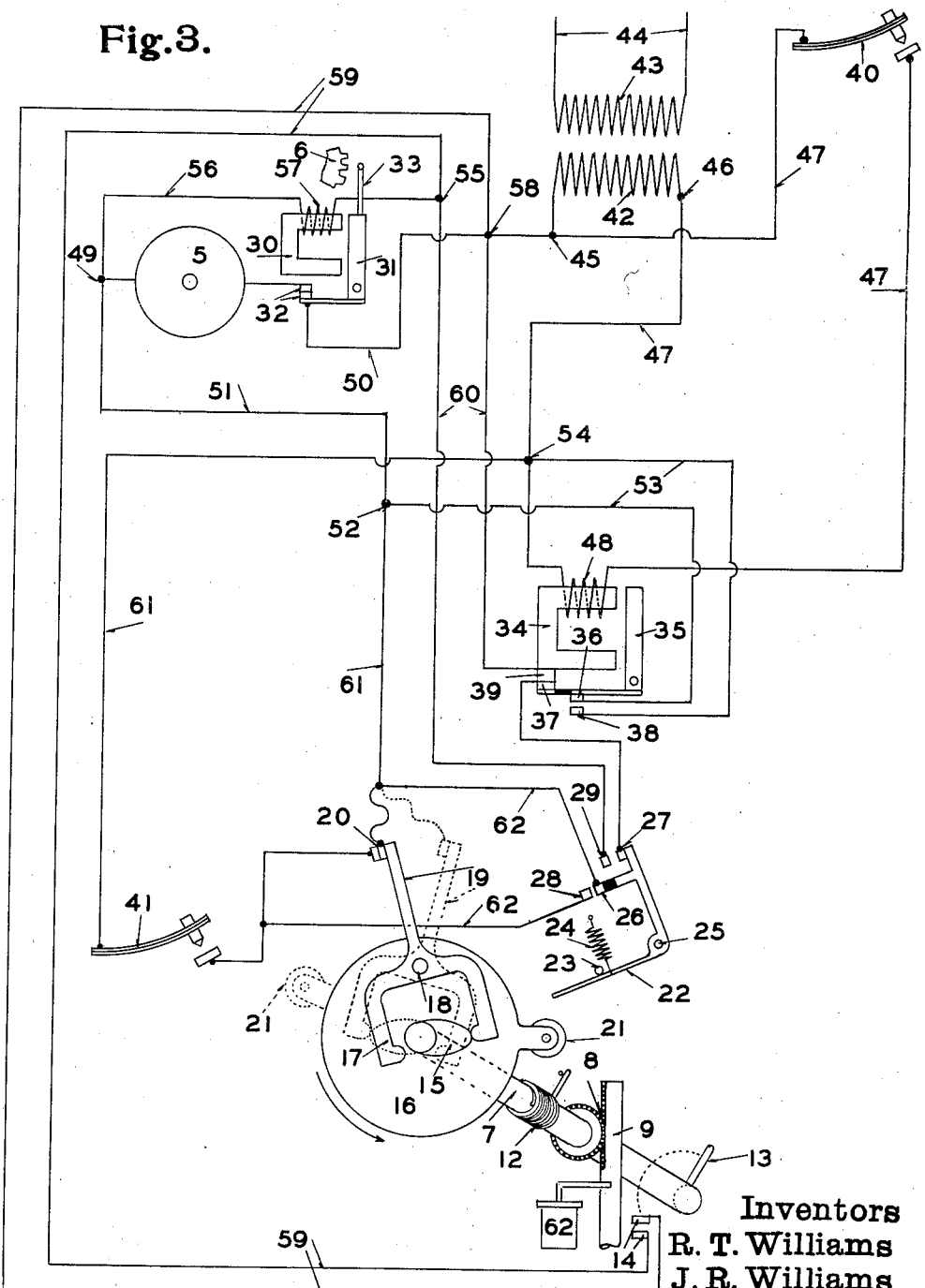

In the accompanying drawings, which illustrate two forms of temperature regulating device made in accordance with our invention, Figure 1 is a semi-diagrammatic view; Figure 2 is a sectional view of one form of retarding device; Figure 3 is a wiring diagram; and Figure 4 is a wiring diagram showing a modification.

Referring first to Figures 1 to 3, 5 indicates an electric motor acting through a multiplying gear train 6 to drive a shaft 7 which, through a rack and pinion connection 8, acts to raise a valve stem 9 and so unseat valve 10 to permit fuel to flow through a valve casing 11 interposed in the fuel feed line of the heater to be regulated. The valve is moved to its closed position by any suitable biasing means, such as a coil spring 12 (Figure 3) would on the shaft 7.

Carried on one end of the shaft 7 is a pin 13 adapted to close contacts 14. On the other end of the shaft is a cam 15 and a disc 16. The cam is adapted to contact alternately with the two ends of a yoke 17 pivoted at 18 and provided with an arm 19. Carried on the arm 19 is one of a pair of contacts 20. When cam 15 is in the position indicated by full lines, the yoke will be moved to close the contacts 20, and when in the position indicated by dotted lines, it will swing the yoke to separate the contacts. The pivot 18 is of the friction type so as to hold the yoke in the position in which it is placed until positively moved into the other position. Carried on the disc 16 is a roller 21 adapted to contact with one arm of a bell-crank lever 22, which arm is held against a stop 23 by a spring 24. This arm is flexible so that when the disc moves in the direction indicated by the arrow, the roller may pass the lever by slightly bending the arm without moving the lever on its pivot 25. When, however, the disc moves in the reverse direction, engagement of the roller with the arm will move the lever on its pivot to move contacts 26 and 27, carried by the other arm of the lever, against contacts 28 and 29, respectively. Contacts 26 and 27 are insulated from each other and are so arranged that the contact 26 engages the contact 28 slightly prior to the engagement of the contact 27 with contact 29.

The main relay 30 is provided with an armature 31 carrying one of a pair of contacts 32 which are normally closed. When the relay is energized, the contacts 32 are opened and immediately thereafter a locking detent 33, carried by the armature, is moved into engagement with the teeth of one of the gears of the train 6. A secondary relay 34 is provided with an armature 35 carrying contacts 36 and 37 insulated from each other and adapted to engage with contacts 38 and 39, respectively. When the armature 35 is in normal position, contacts 36 and 38 are open and 37 and 39 closed, but when the relay is energized, the condition is reversed, contacts 36 and 38 being closed and 37 and 39 open. The main thermostat 40 is placed in one part of the room, as for example the upper part, and the auxiliary thermostat 41 at another part, as for example close to the floor of the room. Current for the operation of the device may be supplied from any suitable source, such as the secondary 42 of a transformer, the primary 43 of which is connected to the line wires 44.

Connected across the terminals 45 and 46 of the secondary of the transformer, is a circuit 47 including the thermostat 40 and the coil 48 of the relay 34. The coil 48 is of high resistance relative to the voltage of the secondary so that the circuit, when closed, will not interfere with the current supply to the motor when the circuit through the latter is in parallel therewith. Leading from the terminal 45 to point 49, is a conductor 50 including in series, the motor and the contacts 32. Leading from 49 is a conductor 51 connected at 52 to one end of a circuit 53 including the pair of contacts 36 and 38 and connected at 54 to the circuit 47. Leading from 49 to 55 is a conductor 56 including the winding 57 of the relay 30. Connecting 55 and a point 58 in the circuit 47, is a circuit 59 including the pair of contacts 14. The points 55 and 58 are also connected by a circuit 60 including in series the two pair of contacts 37 and 39 and 27 and 29. Points 52 and 54 are connected by 61, including in series the auxiliary thermostat 41 and the pair of contacts 20. These contacts 20 are shunted by a circuit 62 including the pair of contacts 26 and 28.

The operation of our device is as follows: when the main thermostat 40 is closed, current flows in the circuit 47, energizing the relay 34 and thus moving its armature 35 to open contacts 37 and 39 and close contacts 36 and 38. Closing the latter named pair of contacts establishes the following circuit: from transformer terminal 45 through line 50, including the motor, to 49 and thence through line 51 and circuit 53 to 54, and finally through a portion of circuit 47 to the other transformer terminal 46. This supplies current to the motor which, acting through the gear train, raises the valve stem 9 to open the fuel valve 10. When the valve comes to its full open position, pin 13 will close contacts 14. Closing contacts 14 sets up a shunt circuit around the motor from 49 to 58 through line 56 and circuit 59, thus permitting a portion of the motor circuit current to flow through coil 57 to energize relay 30. This moves armature 31 to open contacts 32 and stop the motor. At the same time lock arm 33 is thrown into engagement with the gear train to prevent the return of the valve to closed position. While the separation of the contacts 32 breaks one side of the motor circuit and so stops the motor, current continues to flow through the other side and the above described shunt circuit so that relay 30 holds the valve locked in open position as long as thermostat 40 remains closed. When the thermostat opens, circuit 47 is broken, deenergizing relay 34, so breaking the other side of the motor circuit and deenergizing relay 30. This releases lock arm 33 from engagement with the gear train and permits the valve to return to closed position under the influence of the biasing spring 12. It will be seen, therefore, that the thermostat 40 controls the movement of the valve from closed to fully open position, or the reverse. It is to be noted that opening or closing of the auxiliary thermostat 41, while the thermostat 40 is closed, will not interfere with the operation of the device as its only effect will be to open or close a shunt circuit 80 around the circuit 53 which is closed as long as the thermostat 40 remains closed.

The operation of the auxiliary thermostat 41 in bringing the valve to an intermediate position, may occur under two conditions; first, both thermostats may be open when, due to cooling of the air in one part of the room, thermostat 41 closes; second, both thermostats may be closed when, due to unequal heating at their respective locations, the thermostat 40 opens while thermostat 41 remains closed.

Under the first named condition, before the valve has begun to open, arm 19 will be in the position shown in full lines, closing contacts 20 so that when the thermostat 41 is closed, the following circuit is set up: from terminal 45, through lines 50 and 51 to point 52 and thence through circuit 61 to point 54 and thence through a portion of the circuit 47 to the other transformer terminal 46. This actuates the motor to open the valve. When the valve reaches full open position, cam 15 contacts with the left hand side of yoke 17, moving arm 19 into the position shown in dotted lines and so breaking the motor circuit. It will be noted that under these conditions circuit 53, forming part of the circuit necessary to energize relay 30 by closing contacts 14, remains open so that the relay does not function when pin 13 closes contacts 14 but allows the valve to start upon its return movement. When the valve has returned a predetermined distance, roller 21 strikes the arm of the bell-crank lever 22 swinging it upon its pivot 25. The movement of lever 22 first closes contacts 26 and 28, supplying current to the motor to check the return movement of the valve. Immediately thereafter, contacts 27 and 29 are closed, energizing relay 30 to break the motor circuit and throw the arm 33 into engagement with the gear train to lock the valve in its intermediate position. As the arm engages with the gear after it has been brought substantially to rest by the impulse sent through the motor, shock is avoided. The valve will remain in its intermediate position until normal temperature is secured throughout the room when thermostat 41 will open. Opening of the thermostat breaks the circuit through relay 30 and allows the valve to go to closed position.

When both thermostats are closed and thermostat 40 open, the valve is in its fully open position and the yoke 17 is in the position indicated by dotted lines so that the same conditions prevail as when the valve is brought to raised position by the closing of thermostat 41 and its return first to intermediate and finally to closed position, is the same as above described.

In order to increase the time during which the valve is held wide open to insure the ignition of all the burners, it may be found desirable to provide the device with retarding means for delaying the movement of the valve from full open to intermediate position. While this delayed action may be secured in various ways, in Figures 2 and 3 we have shown a dash-pot 62. The piston 63 is moved by a rod 64 carried on the valve stem. The piston is provided with a valve 65 and a restricted port 66. Formed in the walls of the dash-pot are by-passes 67 located to correspond with the travel of the piston while the valve 10 is moving between intermediate and closed position. The dash-pot is to be filled with oil or other liquid.

In the operation of the retarding device, the valve 65 opens during the upward movement of the valve 10 so as not to impede such movement. However, when the valve 10 starts on its return movement from full open to intermediate position, the valve 65 will close so that the speed of travel will be governed by the size of the restricted port 66 through which the liquid is forced to pass. When the valve moves from intermediate to closed position, the liquid will pass freely around the piston through the by-passes 67 so that this portion of its travel will not be retarded.

In Figure 4 we have shown a modification in which electrically controlled means are employed to maintain the valve in full open position for a limited time when brought to the position by the thermostat 41. In the form shown in the drawings we accomplished this by the addition of certain circuits, together with their controlling mechanism, which added circuits are shown in heavy lines in Figure 4 for the sake of clearness. A circuit 68 leads from the terminal 45 of the transformer secondary 42 through a winding 69 on the relay 30 to the thermostat 41. From the thermostat 41 the circuit 68 leads through a pair of contacts 70 and a thermal switch 71 to a pair of contacts 72 and thence to the terminal 46 at the other end of the secondary. The contacts 70 are normally open but are closed by the arm 19 when it is in the position shown in Figure 4. The thermal switch 71 consists of a bimetallic element surrounded by a heating coil 73. It is normally closed but is opened when the bimetallic element is heated to the necessary temperature by the coil 73. The time necessary to accomplish this is determined by the construction of the switch. The contacts 72 are closed when no current is flowing in circuit 47 but is opened when flow of current in this circuit energizes the relay 34. A circuit 74 leads from the terminal 45 through a pair of contacts 75 to a pair of contacts 76 and thence through the coil 73 to the terminal 46. The contacts 75 are actuated by the relay 34 in the same manner as the contacts 72. The contacts 76 are normally open but are closed by the pin 13 at the same time as the contacts 14 in the circuit 59.

The operation of the modified form of the device, when operated by closing the thermostat 40, is the same as in the form shown in Figure 3, both the circuit 68 and the circuit 74 being broken by the action of the relay 34 when current flows in the circuit 47. When, however, the valve is brought to its full open position by the action of the thermostat 41, it does not immediately start upon its return movement because the gear train is held in locked position by the action of the relay 30 which is now energized by the auxiliary coil 69. The valve therefore remains in its full open position until the circuit 68 is broken by the action of the thermal switch 71 when it returns to intermediate position in the manner heretofore described.

We have shown and described the circuit closing devices 40 and 41 as thermostats. In some applications where an attendant is constantly on hand, as for example in boiler rooms, one or both of these devices may be replaced by hand-operated switches. We also wish it understood that the magnetic relays 30 and 34 may be replaced by other current operated devices, such for example as thermal switches similar to that shown in Figure 4.

Having fully described our invention, what we claim as new and desire to secure by Letters Patent of the United States is:

1. In an apparatus of the class described, the combination of a regulating device, means biasing said regulating device toward movement in one direction, means including an electric motor for moving the regulating device in the other direction, a switch for controlling the movement of the regulating device from one position to another, and a second switch functioning to bring said regulating device to a position intermediate the positions determined by the first named switch.

2. In an apparatus of the class described, the combination of a regulating device, means biasing said regulating device toward movement in one direction, means including an electric motor for moving the regulating device in the other direction, a temperature actuated device for controlling the movement of the regulating device from one position to another, and a second temperature actuated device spaced from said first named temperature device functioning to hold said regulating device in an intermediate position between said first named positions.

3. In an apparatus of the class described, the combination of a regulating device, means biasing said regulating device toward movement in one direction, means including an electric motor for moving the regulating device in the other direction, a switch for controlling the movement of the regulating device from one position to another, and a second switch spaced from said first named switch functioning to hold said regulating device in an intermediate position between said first named positions, said second switch first functioning to cause the regulating device to move beyond the predetermined intermediate position.

4. In an apparatus of the class described, the combination of a regulating device, means biasing said regulating device toward movement in one direction, means including an electric motor for moving the regulating device in the other direction, a temperature actuated device for controlling the movement of the regulating device from one position to another, and a second temperature actuated device spaced from said first named temperature device functioning to hold said regulating device in an intermediate position between said first named positions, said second temperature regulating device first functioning to cause the regulating device to move beyond the predetermined intermediate position.

5. In an apparatus of the class described, the combination of a regulating device, means biasing said regulating device toward movement in one direction, means including an electric motor for moving the regulating device in the other direction, a temperature-actuated switch for controlling the movement of the regulating device from one position to another and a second temperature-actuated switch spaced vertically from said first named switch and functioning to bring said regulating device to an intermediate position between the positions determined by said first named switch.

6. In an apparatus of the class described, the combination of a regulating device, means biasing said regulating device toward movement in one direction, means including an electric motor for moving the regulating device in the other direction, a temperature actuated device for controlling the movement of the regulating device from one position to another, a second temperature actuated device spaced vertically from said first named temperature device and functioning to hold said regulating device in an intermediate position between said first named positions, and retarding means for delaying the return movement of the regulating device to the intermediate position.

7. In an apparatus of the class described, the combination of a regulating device, gearing for actuating said regulating device, means biasing said gearing in one direction, a motor for driving the gearing in the other direction, a current source, a circuit including said source and a switch, a circuit in parallel with said first named circuit and including the motor, means actuated by the flow of current in said first named circuit for closing the second named circuit to actuate the motor, a circuit in shunt with the motor including a relay, said relay being adapted to break the motor circuit and lock the gearing, means actuated from the gearing for closing said shunt circuit to hold the regulating device in extreme position, and means including a second switch for closing said shunt circuit to hold the regulating device in intermediate position.

8. In an apparatus of the class described, the combination of a regulating device, gearing for actuating said regulating device, means biasing said gearing in one direction, a motor for driving the gearing in the other direction, a current source, a circuit including said source and a thermostat, a circuit in parallel with said first named circuit and including the motor, means actuated by the flow of current in said first named circuit for closing the second named circuit to actuate the motor, a circuit in shunt with the motor including a relay, said relay being adapted to break the motor circuit and lock the gearing, means actuated from the gearing for closing said shunt circuit to hold the regulating device in extreme position, and means including a second thermostat for closing said shunt circuit to hold the regulating device in intermediate position.

9. In an apparatus of the class described, the combination of a regulating device, gearing for actuating said regulating device, means biasing said gearing in one direction, a motor for driving the gearing in the other direction, a current source, a circuit including said source and a switch, a circuit in parallel with said first named circuit and including the motor, means actuated by the flow of current in said first named circuit for closing the second named circuit to actuate the motor, a circuit in shunt with the motor including a relay, said relay being adapted to break the motor circuit and lock the gearing, means actuated from the gearing for closing said shunt circuit to hold the regulating device in extreme position, a circuit in series with the motor circuit and including a second switch for moving said regulating device to extreme position but permitting its return movement, and means operated from the gearing for arresting said regulating device in its return movement to maintain it at an intermediate position.

10. In an apparatus of the class described, the combination of a regulating device, gearing for actuating said regulating device, means biasing said gearing in one direction, a motor for driving the gearing in the other direction, a current source, a circuit including said source and a thermostat, a circuit in parallel with said first named circuit and including the motor, means actuated by the flow of current in said first named circuit for closing the second named circuit to actuate the motor, a circuit in shunt with the motor including a relay, said relay being adapted to break the motor circuit and lock the gearing, means actuated from the gearing for closing said shunt circuit to hold the regulating device in extreme position, a circuit in series with the motor circuit and including a second thermostat for moving said regulating device to extreme position but permitting its return movement, and means operated from the gearing for arresting said regulating device in its return movement to maintain it at an intermediate position.

11. In an apparatus of the class described, the combination of a regulating device, gearing for actuating said regulating device, means biasing said gearing in one direction, a motor for driving the gearing in the other direction, a current source, a circuit including said source and a thermostat, a circuit in parallel with said first named circuit and including the motor, means actuated by the flow of current in said first named circuit for closing the second named circuit to actuate the motor, a circuit in shunt with the motor including a relay, said relay being adapted to break the motor circuit and lock the gearing, means actuated from the gearing for closing said shunt circuit to hold the regulating device in extreme position, a circuit in series with the motor circuit and including a second thermostat for moving said regulating device to extreme position but permitting its return movement, switch mechanism operated from the gearing for arresting said regulating device in its return movement to maintain it at an intermediate position, and retarding means for delaying the movement of said regulating device from extreme to intermediate position.

12. In an apparatus of the class described, the combination of a regulating device, means biasing said regulating device toward movement in one direction, means including an electric motor for moving the regulating device in the other direction through gearing, a main thermostat for controlling the flow of current through the motor, a relay for interrupting the motor current and locking the gearing, a switch operated from the gearing for energizing the relay to lock the gearing in one position, and means including an auxiliary thermostat and auxiliary switching mechanism also operated from the gearing for locking the gearing in another position.

13. In an apparatus of the class described, the combination of a regulating device, means biasing said regulating device toward movement in one direction, means including an electric motor for moving the regulating device in the other direction through gearing, a main thermostat for controlling the flow of current through the motor, a relay for interrupting the motor current and locking the gearing, a switch operated from the gearing for energizing the relay to lock the gearing in one position, and means including an auxiliary thermostat for locking the gearing in another position, said means also including a second switch in series with the auxiliary thermostat; means operated from the gearing for opening said second switch when moving in one direction and closing it when moving in the other direction, a shunt around said second named switch, and a third switch in said shunt circuit, said third switch being actuated by the gearing when moving in one direction only.

14. In an apparatus of the class described, the combination of a regulating device, means biasing said regulating device toward movement in one direction, means including an electric motor for moving the regulating device in the other direction through gearing, a main thermostat for controlling the flow of current through the motor, a relay for interrupting the motor current and locking the gearing, a switch operated from the gearing for energizing the relay to lock the gearing in one position, and means including an auxiliary thermostat for locking the gearing in another position, said means also including a second switch in series with the auxiliary thermostat; means operated from the gearing for opening said second switch when moving in one direction and closing it when moving in the other direction, a shunt circuit around said second named switch, a third switch in said shunt circuit, said third switch being actuated by the gearing when moving in one direction only, and a retarding device for delaying the action of the gearing during a portion only of its movement.

ROBERT T. WILLIAMS.
JAMES R. WILLIAMS.